United States Patent
Danielson et al.

(10) Patent No.: US 9,977,920 B2
(45) Date of Patent: May 22, 2018

(54) PROVIDING DATA PRIVACY IN COMPUTER NETWORKS USING PERSONALLY IDENTIFIABLE INFORMATION BY INFERENCE CONTROL

(71) Applicant: CA, Inc., New York, NY (US)

(72) Inventors: Debra J. Danielson, Skillman, NJ (US); Steven L. Greenspan, Scotch Plains, NJ (US); Kenneth William Scott Morrison, New Westminster (CA)

(73) Assignee: CA, INC., New York, NY (US)

( * ) Notice: Subject to any disclaimer, the term of this patent is extended or adjusted under 35 U.S.C. 154(b) by 144 days.

(21) Appl. No.: 15/077,193

(22) Filed: Mar. 22, 2016

(65) Prior Publication Data
US 2017/0277908 A1 Sep. 28, 2017

(51) Int. Cl.
| | | |
|---|---|---|
| G06F 12/14 | (2006.01) | |
| H04L 29/06 | (2006.01) | |
| G06F 21/62 | (2013.01) | |
| G06F 17/30 | (2006.01) | |

(52) U.S. Cl.
CPC .... G06F 21/6245 (2013.01); G06F 17/30867 (2013.01); H04L 63/1433 (2013.01)

(58) Field of Classification Search
CPC ........... G06F 21/6245; G06F 17/30867; H04L 63/1433
USPC ......................... 726/28, 23, 25; 713/165, 188
See application file for complete search history.

(56) References Cited

U.S. PATENT DOCUMENTS

| | | | |
|---|---|---|---|
| 7,519,591 B2 | 4/2009 | Landi et al. | |
| 8,504,481 B2 | 8/2013 | Motahari et al. | |
| 8,555,388 B1* | 10/2013 | Wang | H04L 63/1416 709/245 |
| 9,043,922 B1* | 5/2015 | Dumitras | G06F 21/577 726/25 |
| 2008/0229419 A1* | 9/2008 | Holostov | G06F 21/564 726/24 |
| 2015/0326601 A1* | 11/2015 | Grondin | G06Q 10/0635 726/25 |
| 2015/0370228 A1* | 12/2015 | Kohn | G06Q 50/06 700/31 |
| 2016/0042197 A1* | 2/2016 | Gkoulalas-Divanis | G06F 17/30165 707/781 |
| 2016/0063229 A1* | 3/2016 | Key | G06F 21/316 726/1 |

(Continued)

*Primary Examiner* — Aravind K Moorthy
(74) *Attorney, Agent, or Firm* — Sage Patent Group

(57) ABSTRACT

Data privacy is provided in a computer network using a security inference control processor of a network device in the computer network which receives a query from a user device through a network interface circuit. In response to the query, a query result data set is generated based on information in a database stored in a non-volatile data storage device. Personally Identifiable Information (PII) exposure risk associated with the query result data set is determined based on an evaluation of combining the query result data set with an exposure storage log that includes result data sets from past queries associated with the user. Based on the PII exposure risk, the query result data set is provided to the user, so as to refrain from providing the query result data set if the PII exposure risk is greater than a risk threshold. Related methods, devices, and computer program products are provided.

20 Claims, 8 Drawing Sheets

(56) References Cited

U.S. PATENT DOCUMENTS

2016/0226985 A1* 8/2016 Yoon ................... H04L 67/2861
2017/0236078 A1* 8/2017 Rasumov ........... G06Q 10/0635
       705/7.28
2017/0250810 A1* 8/2017 Guohua ................ H04L 9/0894

* cited by examiner

PROVIDING DATA PRIVACY IN COMPUTER NETWORKS USING PERSONALLY IDENTIFIABLE INFORMATION BY INFERENCE CONTROL

FIELD

Various embodiments described herein relate to methods, devices, and computer program products and more particularly to methods, devices, and computer program products for providing data privacy in computer networks.

BACKGROUND

Data networks and data centers are proliferating worldwide with the increased use of technology such as the Internet, virtualization, and cloud computing. A large amount of data may be stored in data centers or other databases and accessible across data networks. This data may be queried or searched using various interfaces and tools. However, privacy of this data is of great concern to individuals as well as organizations.

SUMMARY

Some embodiments of the present inventive concepts are directed to a method for providing data privacy in a computer network. The method includes performing, by a security inference control processor of a network device in the computer network, operations that include receiving a query from a user device that is associated with a user through a network interface circuit, and generating, in response to the query, a query result data set based on information in a database stored in a memory including a non-volatile data storage device. Personally Identifiable Information (PII) exposure risk associated with the query result data set may be determined based on an evaluation of combining the query result data set with an exposure storage log that includes query result data sets from past queries associated with the user. Based on the PII exposure risk, the query result data set may be selectively provided to the user in response to the query, so as to refrain from providing the query result data set if the PII exposure risk is greater than a risk threshold.

In some embodiments, determining the PII exposure risk includes determining an exposure type of the query result data set. The exposure type includes one of exposure complete type, exposure element type, or exposure unprotected type. The exposure complete type indicates protected information, the exposure element type indicates information that is protected when considered collectively with other information, and the exposure unprotected type indicates unprotected information. Determining the PII exposure risk includes determining the PII exposure risk based on the exposure type. In some embodiments, determining the exposure type of the query result data set may include determining a respective exposure type of a respective element of the query result data set. Determining the PII exposure risk based on the exposure type includes setting the PII exposure risk to a value based on an PII exposure risk of one or more elements of the query result data set. The method may include increasing the PII exposure risk in response to the respective exposure type being exposure complete, and/or decreasing or not changing the PII exposure risk in response to the respective exposure type being exposure unprotected.

In some embodiments, determining the PII exposure risk based on the exposure type includes setting the PII exposure risk to a value based on an PII exposure risk of the query result data set, and determining, in response to the exposure type of the query result data set being exposure element, one or more relationships with elements of the query result data sets in the exposure storage log, determining a composite PII exposure risk associated with the query result data set based on the one or more relationships with elements of the query result data sets in the exposure storage log, and modifying the PII exposure risk based on the composite PII exposure risk associated with the query result data set.

In some embodiments, the risk threshold may be based on one or more elements of the query result data set. The risk threshold may be based on a policy associated with the user. The risk threshold may be based on a policy associated with one or more elements in the query result data set. Generating the query result data set includes generating the query result data set without providing the query result data set to the user.

In some embodiments, the method includes determining a group PII exposure risk associated with the query result data set based on an evaluation of combining the query result data set with a group exposure storage log that includes query result data sets from past queries associated with a group of users including the user. Selectively providing the query result data set to the user includes selectively providing, based on the PII exposure risk and/or the group PII exposure risk, the query result data set, so as to refrain from providing the query result data set if the PII exposure risk is above a risk threshold and/or if the group PII exposure risk is above a group risk threshold.

In some embodiments, the method includes adding the query result data set to the exposure storage log, in response to the PII exposure risk being less than or equal to the risk threshold. Adding the query result data set to the exposure storage log may include tagging elements of the query result data set in the database to indicate one or more of the user, a timestamp, and/or information associated with the query. Determining the PII exposure risk may include identifying an element in the exposure storage log that corresponds to the query result data set, determining an age of the element in the exposure storage log that corresponds to the query result data set based on a timestamp associated with the element in the exposure storage log that corresponds to the query result data set, and decreasing the PII exposure risk in response to the age being greater than an age threshold.

In some embodiments, the query result data set is generated at a first time. Determining the PII exposure risk may include generating, in response to the query, a past query result data set based on information in the database at a second time earlier than the first time. The PII exposure risk may be decreased, in response to determining that the query result data set is different from the past query result data set.

In some embodiments, the database includes an immutable database with data in the immutable database that is marked as deleted. Selectively providing the query result data set to the user includes determining that the query result data set includes at least one data element that is marked as deleted in the immutable database, and selectively providing the query result data set to the user if the user is authorized to access the at least one data element that is marked as deleted in the immutable database and based on the PII exposure risk. The method may include setting an associated PII exposure risk associated with the query result data set in the exposure storage log.

Embodiments of the present inventive concepts may also be directed to a network device that includes a network interface configured to communicate with a user query interface through a data network, a security inference control processor, and a memory coupled to the security inference control processor and storing computer readable program code that is executable by the security inference control processor to perform functions and operations as disclosed herein. The operations may include receiving a query from a user device that is associated with a user through a network interface circuit. The operations may include generating, in response to the query, a query result data set based on information in a database stored in a memory including a non-volatile data storage device. The operations may include determining a Personally Identifiable Information (PII) exposure risk associated with the query result data set based on an evaluation of combining the query result data set with an exposure storage log including query result data sets from past queries associated with the user, and selectively providing, based on the PII exposure risk, the query result data set to the user in response to the query, so as to refrain from providing the query result data set if the PII exposure risk is greater than a risk threshold.

In some embodiments, the security inference control processor is further configured to perform operations including determining a group PII exposure risk associated with the query result data set based on an evaluation of combining the query result data set with a group exposure storage log with query result data sets from past queries associated with a group of users including the user. Selectively providing the query result data set to the user may include selectively providing, based on the PII exposure risk and the group PII exposure risk, the query result data set, so as to refrain from providing the query result data set if the PII exposure risk is above a risk threshold and/or if the group PII exposure risk is above a group risk threshold.

Embodiments of the present inventive concepts may also be directed to a computer program product that includes a non-transitory computer readable storage medium including computer readable program code embodied in the medium that when executed by an a security inference control processor of a first network device causes the processor to perform functions and operations as disclosed herein. The operations may include receiving a query from a user device that is associated with a user through a network interface circuit. The operations may include generating, in response to the query, a query result data set based on information in a database stored in a memory including a non-volatile data storage device. The operations may include determining a Personally Identifiable Information (PII) exposure risk associated with the query result data set based on an evaluation of combining the query result data set with an exposure storage log including query result data sets from past queries associated with the user, and selectively providing, based on the PII exposure risk, the query result data set to the user in response to the query, so as to refrain from providing the query result data set if the PII exposure risk is greater than a risk threshold.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

DETAILED DESCRIPTION

Figure 1:
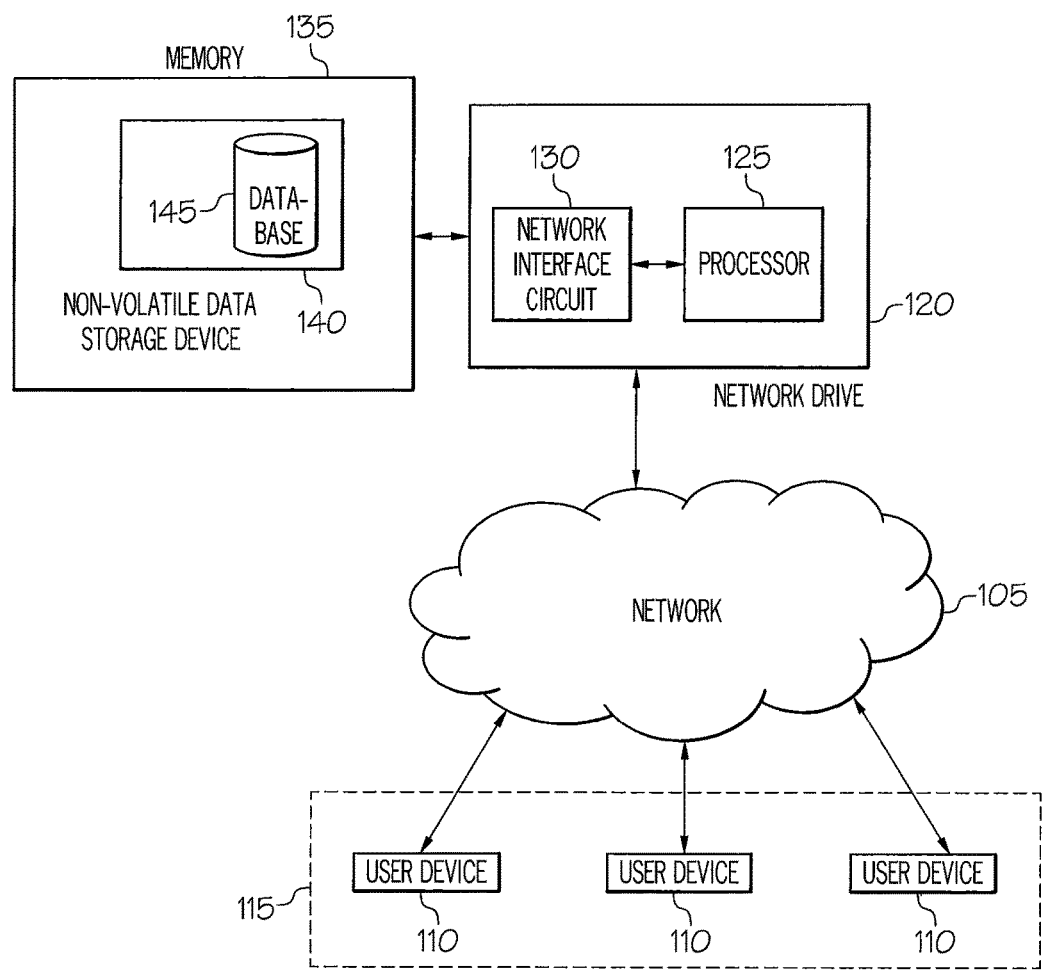
FIG. 1 illustrates a computer network including a network device for accessing stored data by users, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout. Numerous specific details are set forth in order to provide a thorough understanding of embodiments of the present inventive concepts. However, it will be understood by those skilled in the art that the present invention may be practiced without these specific details. In other instances, well-known methods, procedures, components and circuits have not been described in detail so as to not obscure the present invention. It is intended that all embodiments disclosed herein can be implemented separately or combined in any way and/or combination.

As noted above, data networks and data centers are proliferating worldwide with the increased use of technology such as the Internet, virtualization, and cloud computing. Large volumes of data, such as "big data", may be stored in data centers or other databases. This data may be accessible to users across data networks. Users may query a database containing data through a variety of interfaces. The data may include Personally Identifiable Information (PII) or provide an inference channel to PII that could potentially identify a specific individual. Personally identifiable information may be used to distinguish one person from another and may be used for de-anonymizing anonymous data. Protection of personal and confidential data is a challenging responsibility for organizations, particularly in cases where the data is available to a multitude of researchers, developers, and other internal and external data consumers. Further complicating the challenges for organization is the inference control problem where even non-PII information, when consolidated with other information, may provide an inference channel to reveal PII.

Various embodiments described herein may arise from a recognition for a need to ensure security of PII by providing inference control such that non-PII information, in aggregate with other information, will not reveal PII to a user. A user may run multiple different queries on a database to obtain different pieces of information. A security mechanism is needed to prevent the aggregated data from the different queries from revealing PII to the user. In other words, inference channels need to be controlled and/or shut down. Various embodiments described herein provide methods, devices, and computer program products to provide inference control for the privacy of PII.

Two examples will now be discussed to aide in understanding the inference control problem associated with PII. A company's database may include results of a survey related to employment, job titles, salary, location, and/or gender. A user may make a first query of the database to obtain an average salary of all of the Vice Presidents (VPs) of a company in the Northeast region. The total number of VPs is not revealed to the user based on this query. A user may subsequently query the database to obtain a listing of the Vice Presidents in the Northeast and find that Jane Doe is the only VP in the Northeast. Based on the results of the two queries, an inference of Jane Doe's salary may be obvious since Jane Doe is the only VP in the Northeast so the average salary from the first query would indeed be Jane Doe's salary. In the simple example, two basic, seemingly innocuous queries resulted in a very specific inference of personally identifiable information about Jane Doe. In other examples, multiple queries may cull a data set to a significantly small resulting data set that provides, or almost provides, personally identifiable information. A small data set that almost provides personally identifiable information may not be desirable to an organization or data owner.

In another example, the results of a companywide survey of 5000 individuals may be available in a database. The first query may produce a listing of employees in the product marketing group of the company that participated in the survey and their comments. This listing of the product marketing group may include 200 people. The collection of comments resulting from the first query may include an unprofessional comment about the work environment. A second query may search for employees of the company in a German site and their comments. The second query may result in comments from the 30 people in the Germany. If the same unprofessional comment noted in the results of the second query as in the first query, an inference may be made that this comment came from a product marketing team member located in Germany. Since the company only has six product marketing team members in Germany, the two queries by the same user results in a very small data set of employees that made the unprofessional comment. A third query by the same user may request a list of comments from employees in the 50 to 55 age range. This third query may result in 25 employees, but may include the same unprofessional comment seen in the first two queries. A review of the results of the third query may show only one employee in that age range in product marketing from Germany. Therefore, based on the three queries by the user, an inference may be made identifying the exact employee that provided the unprofessional comment, even though the results of this survey were intended to be confidential. Each of the individual queries appear to be innocuous and do not reveal personal identifying information. However, a review of the resulting data sets from the three queries would allow the inference of the individual providing the specific unprofessional comment. Methods, devices, and/or computer program products that maintain privacy of data by preventing multiple queries from revealing personal identification information will now be discussed in detail. The ongoing survey example will be discussed in detail to aide in explanation of the methods, devices, and/or computer program products that follow.

Referring now to FIG. 1, a network 105 that includes various user devices 110, a network device 120, and a memory 135, is illustrated. The network may include any type of network such as a local area network (LAN), a wide area network (WAN), connections to external computers (for example, through the Internet), and/or a cloud computing environment through which data in the memory 135 may be accessed. Queries from an individual user device 110 may be processed to prevent compromising personally identifiable information. In some embodiments, multiple user devices 110 may be considered as a group 115, such that queries from the group 115 are considered in aggregate when protecting access to personally identifiable information. A network device 120 may reside in the network 105 and control access to data stored in memory. The network device 120 may include a network interface circuit 130 that interfaces through the network 105 to a user device 110. The network interface circuit may be coupled to a processor circuit such as a security inference control processor 125. The security inference control processor 125 may perform analytical processing to process large amounts of data, i.e. "big data", to search for systematic relationships between variables based on queries from user devices 110. The security inference control processor 125 may perform various operations as illustrated in flowcharts in FIGS. 2 to 14 to provide data privacy in the network, which will be discussed in further detail below. The security inference control processor 125 may access memory 135 which includes a non-volatile data storage device 140 that includes a storage component such as database 145. The database 145 may include data such as the survey results described in the ongoing survey example. The data in the database may be organized in data structures that are accessible to a user query from user device 110. In some embodiments, computer program instructions may be stored in memory 135 and may be provided to the security inference control processor 125, such that the instructions execute via the security inference control processor 125. The memory 135 may be external to the network device 120 or may be coupled with or be within the network device 120.

Figure 2:
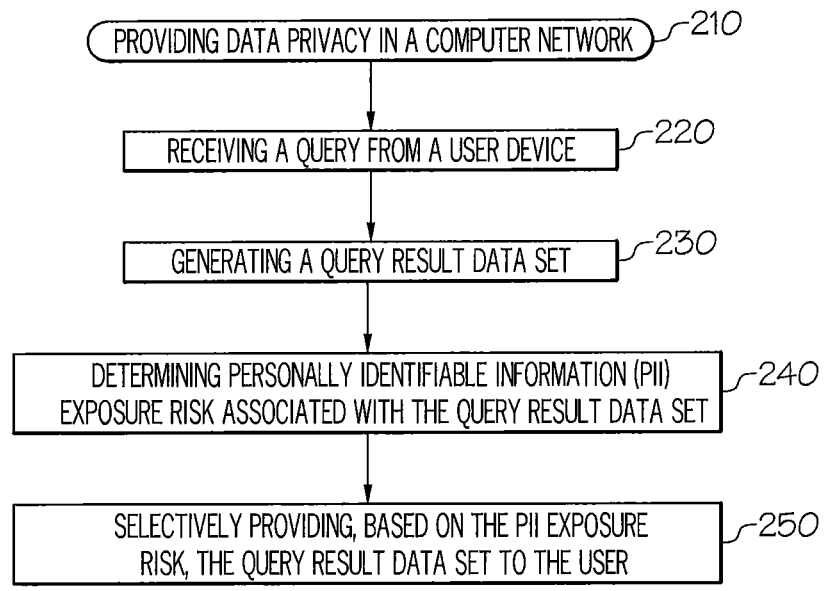
FIGS. 2 to 14 are flowcharts of operations that may be performed by the network device of FIG. 1, according to various embodiments described herein.

Referring now to FIG. 2, a flowchart of operations that may be performed by the security inference control processor 125 of network device 120 of FIG. 1 is illustrated. These operations may be executed by the security inference control processor 125 of network device 120 and may be stored in memory 135 or in the network device 120 of FIG. 1 to be executed by security inference control processor 125 of network device 120 of FIG. 1. At block 210 of FIG. 2, the network device 120 may be configured for providing data privacy in the network 105 of FIG. 1. A query may be input by a user of user device 110 of FIG. 1. At block 220 of FIG. 2, a query may be received across network 105 through the network interface circuit 130 by the security inference control processor 125 of FIG. 1. In some embodiments, the query may be received from any of user devices 110 associated with a group 115 of user devices. At block 230 of FIG. 2, a query result data set is generated by the security inference control processor. This query result data set may be generated by the security inference control processor without providing it to the user until validation of the privacy of the query result data set has been completed.

Still referring to FIG. 2, at block 240, a Personally Identifiable Information (PII) exposure risk associated with the query result data set may be determined. The PII exposure risk may be based on an evaluation of combining the query result data set with an exposure storage log. The exposure storage log includes one or more query result data sets from past queries associated with the user and/or associated with the same user group or organization. In some embodiments, the query result data set is combined with one or more query result data sets from past queries in the exposure storage log to determine if the resulting combined data set includes fewer elements than a threshold. In the ongoing survey example, the second query produces 30 employees in Germany. However, the results of the second query, when coupled with the results of the first query which included 200 product marketing group employees, would produce an intersecting set of 6 employees. The PII exposure risk may be determined based on this intersecting set. At block 250, based on the PII exposure risk, the query result data set is selectively provided to the user so as to refrain from providing the query result data set if the PII exposure rise is greater than a threshold. In the ongoing survey example, if the threshold for returning results to the user is, for example, 10 elements, then the result of the second query would not be returned to the user since the intersecting set of 6 employees is less than 10 elements, thereby producing a PII exposure risk greater than the threshold. In such cases where the query result data set is not provided to the user, an indication of an error may be returned to the user, an indication of privacy violation may be returned to the user, an empty set may be returned to the user, the owner of the data may be notified, and/or the user may be blocked from attempting future queries. In some embodiments, multiple thresholds may be used to take different actions. For example, a first threshold may be used to enact an absolute block of the data to the user. A second threshold may allow the data to be provided to the user, but with less tolerance for future queries from the same user. A third threshold may result in the data being provided to the user, but with the query being placed in an audit log for the attention of a data administrator. A fourth threshold may place a hold on the query results, pending review by a data administrator who may allow or deny release of the query results to the user. In some embodiments, selectively providing the query result data set to the user in response to the query may include providing a modified query result data set that has reduced accuracy. For example, if the query requested average income at the town level, the modified query result data set that is provided to the user may provide the average income at a superset level of the town, such as at the county level.

Figure 3:
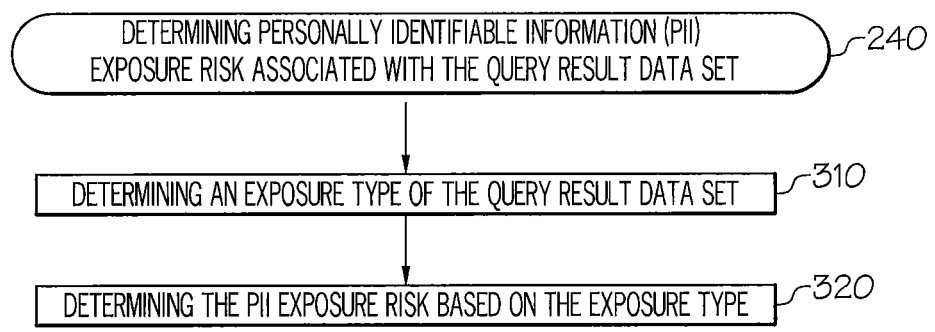

Referring now to FIG. 3, determining PII exposure risk associated with the query result data set at block 240 of FIG. 2, may include determining an exposure type of the query result data set, at block 310. The exposure type may be one of exposure complete type, exposure element type, or exposure unprotected type. The exposure complete type indicates protected information, the exposure element type indicates information that is protected when considered collectively with other information, and the exposure unprotected type indicates unprotected information. In some embodiments, at block 320, the PII exposure risk may be determined based on the exposure type. In the ongoing survey example, the survey result for each employee may include information such as Social Security Number, company site where the employee is located, and the favorite sports team of the employee. The Social Security Number is used in the company to access payroll and employment records so Social Security Number is of exposure complete type. The employee's favorite sports team is not considered to be consequential to privacy and is therefore of exposure unprotected type. The company site where the employee is located is not revealing information by itself since there are many employees at each location, but when coupled with other information, may reveal personally identifiable information and as such, is of exposure element type.

Figure 4:
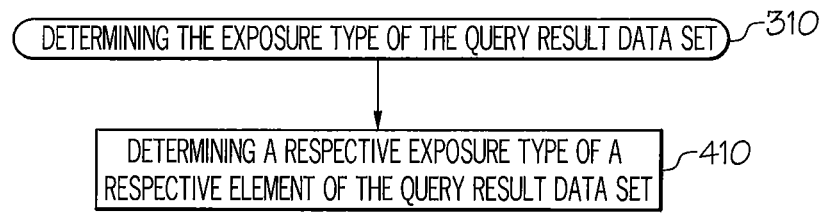

Referring now to FIG. 4, determining the PII exposure risk based on the exposure type may include determining an exposure type of an element of the query result data set, at block 410. In some embodiments, the PII exposure risk may be based on an aggregation of the exposure types of two or more elements of the query result data set. For example, the most restrictive exposure type of the elements of the query result data set, such as the exposure complete type, may be considered as the exposure type of the query result data set. Other strategies for determining the exposure type of the query result data set may include mathematical and/or statistical determination of the exposure type for the query result data set based on the most commonly occurring element, an average, and/or other mathematical measure.

Figure 5:
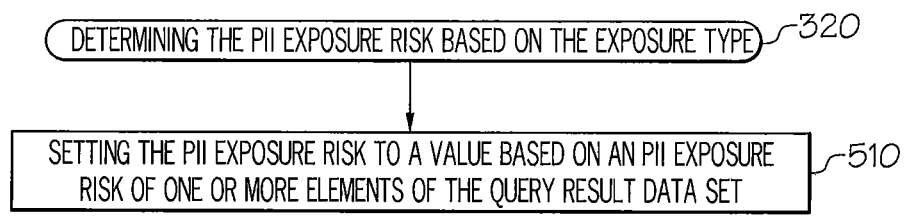

Referring now to FIG. 5, determining the PII exposure risk based on the exposure type may include setting the PII exposure risk to a value based on an PII exposure risk of one or more elements of the query result data set, at block 510. The PII exposure risk may be based on one, two, or all of the elements of the query result data set. In some embodiments, an initial value is set for the PII exposure risk and is then subsequently adjusted based on elements of the query result data set. The PII exposure risk may be a risk score such as a numerical value that is increased or decreased based on the exposure type of one or more elements of the query result data set or based on other factors such as relationships with other elements in the query result data set.

Figure 6:
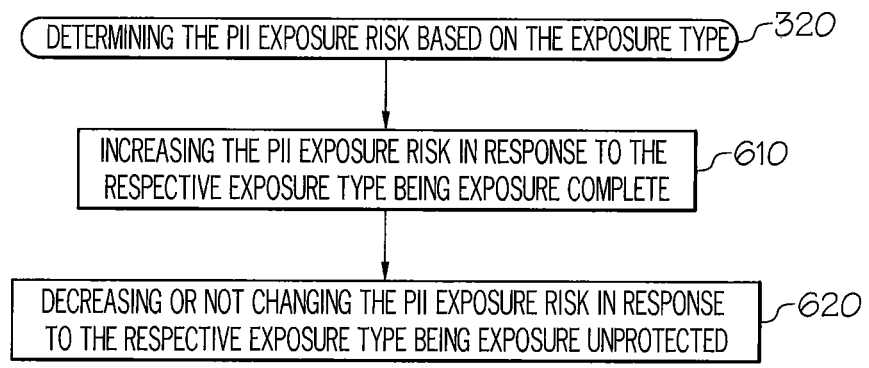

Referring now to FIG. 6, determining the PII exposure risk based on the exposure type may include increasing the PII exposure risk in response to the respective exposure type being exposure complete, at block 610. If the query result data set includes data which, on its own merits, has protected data such as a person's full name, social security number (SSN), complete home address, etc., then the exposure type is exposure complete, which increases the PII exposure risk. In some embodiments, the risk score is increased or incremented when the exposure type is exposure complete. At block 620, the PII exposure risk is decreased if the exposure type of an element of the query result data set is exposure unprotected. Exposure unprotected is for data that is not protected, even when considered in conjunction with exposure complete data. An example of exposure unprotected may be preferences, such as the favorite color of an individual. Even when considered with other data, this information does not reveal personally identifiable information.

Figure 7:
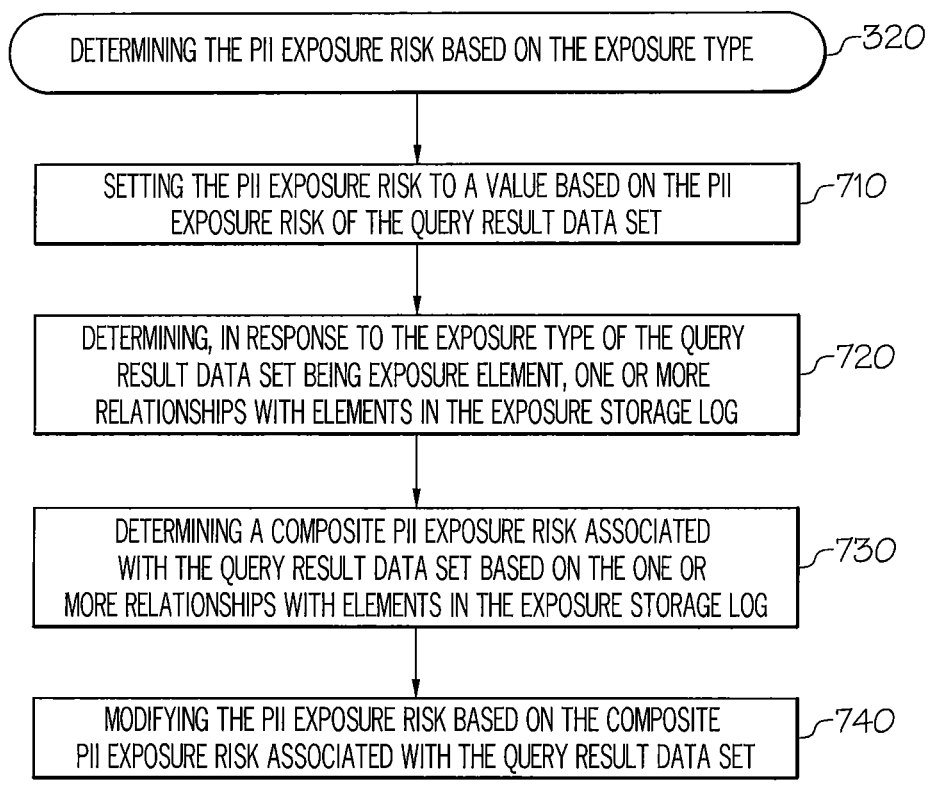

Referring now to FIG. 7, determining the PII exposure risk based on the exposure type may include setting the PII exposure risk to a value based on the PII exposure risk of the query result data set, at block 710. Setting the PII exposure risk to a value may be based on one or more elements of the query result data set. At block 720, in response to the exposure type of the query result data set being exposure element, one or more relationships with elements in the exposure storage log may be determined. A composite PII exposure risk associated with the query result data set may be determined based on one or more relationships with elements in the exposure storage log, at block 730. The PII exposure risk maybe modified based on the composite PII exposure risk associated with the query result data set, at block 740. In some embodiments the composite PII exposure risk may be based on relationships between elements within the query result data set. In the ongoing survey example, the PII exposure risk after the first query may be a value of 20, on a 100 point scale. The results of the second query, when considered in conjunction with the results of the first query in the exposure storage log, may reduce the overlapping data set to 10 people, and produce a composite PII exposure risk of 50. The values in this example are merely provided for illustrative purposes with the key point being that the PII exposure risk is higher based on the second query.

Figure 8:
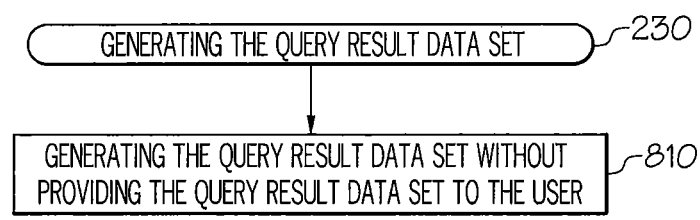

Referring now to FIG. 8, generating the query result data set may include generating the query result data set without providing the query result data set to the user, at block 810. This would occur in cases where the query result data set is determined to expose sensitive data such as personally identifiable information, when combined with other data.

Figure 9:
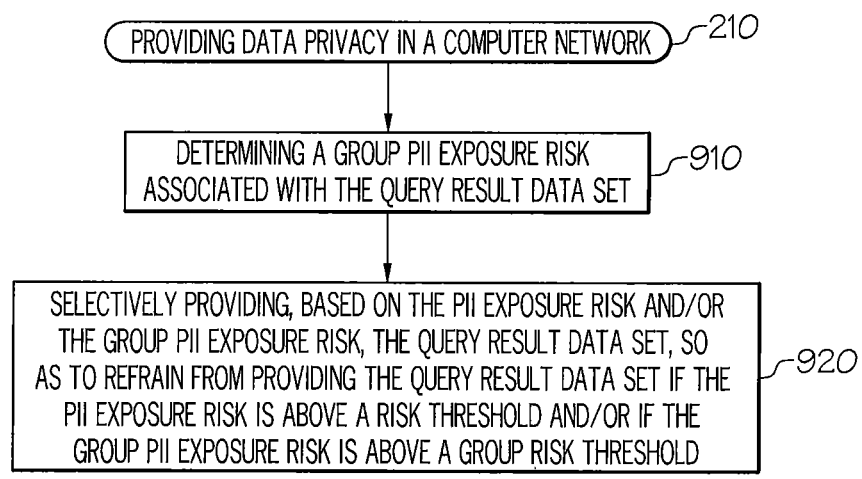

Referring now to FIG. 9, providing data privacy in a computer network may include determining a group PII exposure risk associated with the query result data set, at block 910. A group may be an identified set of users or user devices that are accessible to a group of users who may query the database and obtain information that can be shared with one another. This combined information in the group may expose personally identifiable information. Referring once again to the ongoing survey example, a first user in the group may be the Director of the group and may submit a first query that provides a first resulting data set. These results of the first query may be shared by the Director of the group with other members of the group. A senior marketing specialist who works for the Director may submit a second query that produces a second resulting data set which, when considered in conjunction with the first resulting data set, exposes personally identifiable information. Therefore, to prevent group-based inference channels, it is desired to consider queries by a group of users and/or user devices. At block 920, based on the PII exposure risk and/or the group PII exposure risk, the query result data set may be selectively provided to the user. In this case, the query result data set is selectively provided so as to refrain from providing the query result data set if the PII exposure risk is above a risk threshold and/or if the group PII exposure risk is above a group risk threshold. In some embodiments, the PII exposure risk and the group PII exposure risk may be combined mathematically or otherwise treated in aggregate in order to determine whether to provide the query result data set to the user and/or group of users.

Figure 10:
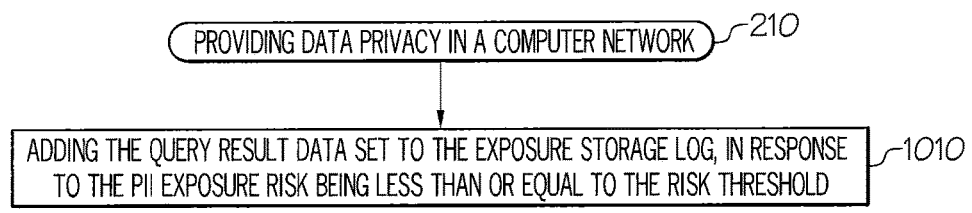

Referring now to FIG. 10, providing data privacy in the computer network may include adding the query result data set to the exposure log, in response to the PII exposure risk being less than or equal to the threshold, at block 1010. The query result data set is added to the exposure storage log for use in determining if future queries are in line with the privacy requirements of the computer network. In some embodiments, the query itself may also be logged, in addition to storing the query result data set in the exposure storage log. In some embodiments, even if the query result data set is not provided to the user, it may still be added to the exposure storage log and be used in making future privacy decisions.

Figure 11:
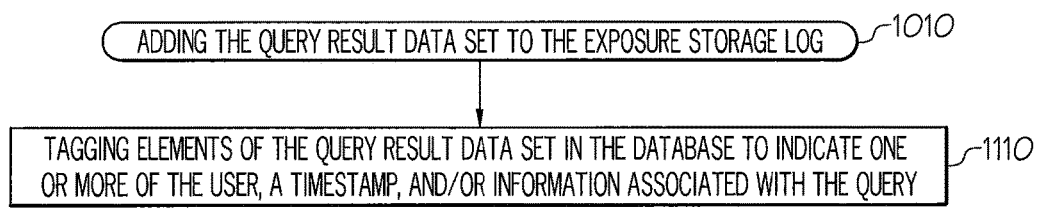

Referring now to FIG. 11, adding the query result data set to the exposure storage log may include tagging elements of the query result data set in the database to indicate information such as parameters associated with the user or group, a timestamp, and or information associated with the query, at block 1110. In other words, the exposure storage log may not copy the query result data set to a separate location, but may tag the existing data elements in the database to indicate membership in the exposure storage log. Additional information associated with the query may be appended to the database entry.

Figure 12:
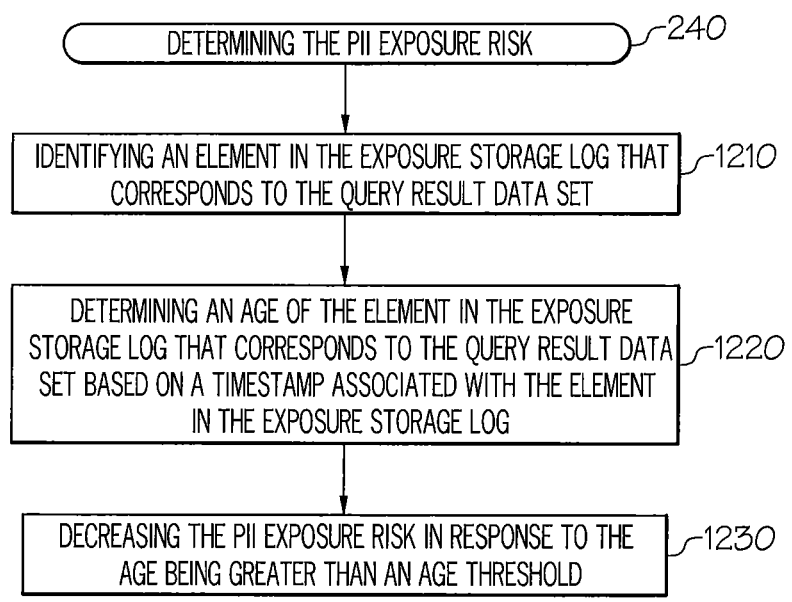

Referring now to FIG. 12, determining the PII exposure risk includes identifying an element in the exposure storage log that corresponds to the query result data set, at block 1210. This identified element in the exposure storage log may, when considered in conjunction with the query result data set, expose personally identifiable information or produce a smaller data set from which personally identifiable information may be discerned. Determining the PII exposure risk may include determining an age of the element in the exposure storage log that corresponds to the query result data set based on a timestamp associated with the element in the exposure storage log, at block 1220. The PII exposure risk may be decreased if the age is greater than an age threshold, at block 1230. In some embodiments, data that has been in the database for a long period of time me be less risky in compromising data privacy. Thus, the age of the data may be taken into consideration when determining the PII exposure risk.

In some embodiments, determining the PII exposure risk may include determining if related data from a similar past query is in the exposure storage log. The query result data set from a present query may have changed from the query result data set from a previous similar past query. The similar past query may include some or all of the same query parameters as the present query but run at a different point in time. A difference in timestamps between the present query and the similar past query may indicate the amount of time between the two queries. A long time period between the present query and the similar past query may indicate that an older query result data set from the similar past query may be stale, i.e. that the query result data set from the present query may have changed from the query result data set from the previous similar past query. A determination that the query result data set is stale may indicate less risk of compromising data privacy, thereby reducing the exposure risk. In some embodiments, the previous query may be run again in response to the present query in order to determine if the query result data set has changed significantly enough to alter the inference equation. In some cases, if it is determined that the query result data set has changed significantly, then inference regarding PII exposure risk may be invalidated.

In some embodiments, the query result data set may be generated at a first time stamp. The PII exposure risk may be determined by generating, in response to the query, a past query result data set based on information in the database at a second time earlier than the first time. The PII exposure risk may be decreased, in response to determining that the query result data set is different from the past query result data set.

Figure 13:
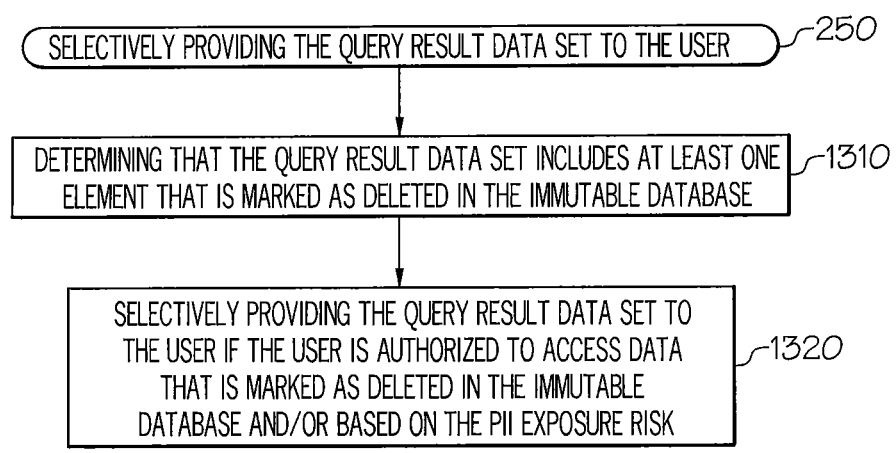

The techniques described herein may be applied to a variety of databases such as relational databases and/or immutable databases. The described techniques may offer particular advantages when applied to an immutable database since an immutable database does not effectively delete any data from the system, making an immutable database particularly susceptible to data privacy concerns. Data that is marked as deleted may not be readily available in the current time-based queries, but may be available in historical queries that request data by providing an older timestamp than the current time. In the ongoing survey example, the unprofessional comment may be deleted from the immutable database on February 29th. However, if a query is conducted with a timestamp of February 15th, the unprofessional comment may be presented as part of the query result data set. In some embodiments, historical queries may be secured by providing access to authorized users. Referring now to FIG. 13, selectively providing the query result data set to the user may include determining that the query result data set includes at least one element that is marked as deleted in the immutable database, at block 1310. The query result data set maybe selectively provided to the user if the user is authorized to access data that is marked as deleted in the immutable data base, at block 1320. The query result data set may be selectively provided to the authorized user based on the PII exposure risk. In some embodiments, the PII exposure risk may be increased for queries that include historical data and/or data that is marked as deleted in the immutable data base.

Figure 14:
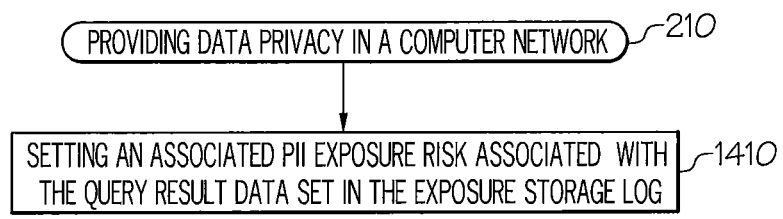

The PII exposure risk that is calculated for a present query may be stored for reference in handling future queries. Referring now to FIG. 14, data privacy maybe provided in the network by setting and/or storing the associated PII exposure risk in the exposure storage log, at block 1410. As previously discussed, the exposure storage log may be used to determine risks associated with a present query by considering data in the exposure storage log associated with previous queries by the same user.

According to some embodiments described herein, data privacy is provided by considering data results of multiple queries that provide an inference channel whereby personal identifiable information is discerned. When a user enters a query, the query is run on the database to obtain the results of the query. However, before providing these results to the user, this resulting data is considered in aggregate with data from prior queries in an exposure log to evaluate personally identifiable information exposure risk. If the PII exposure risk is tolerable (i.e. below a risk threshold), the results of the query are provided to the user. If the PII exposure risk is greater than a threshold, the network device refrains from providing the query result data to the user.

Various embodiments were described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

For purposes of illustration and explanation only, various embodiments of the present invention were described herein in the context of receivers that are configured to receive audio and/or other radio signals. It will be understood, however, that the present invention is not limited to such embodiments and may be embodied generally in any wireless communication terminal that is configured to transmit and receive according to one or more radio access technologies.

As used herein, the terms "user equipment", "user device", or the like, includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. Finally, the term "node" includes any fixed, portable and/or transportable device that is configured to communicate with one or more user equipment/devices and/or a core network.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for providing data privacy in a computer network, the method comprising:
    performing, by a security inference control processor of a network device in the computer network, operations comprising:
        receiving a query from a user device that is associated with a user through a network interface circuit;
        generating, in response to the query, a query result data set based on information in a database stored in a memory comprising a non-volatile data storage device;
        determining a Personally Identifiable Information (PII) exposure risk associated with the query result data by:
            evaluating a combination of the query result data set with an exposure storage log comprising query result data sets from past queries associated with the use;
            determining an exposure type of the query result data set, wherein the exposure type comprises one of exposure complete type, exposure element type, or exposure unprotected type, wherein the exposure complete type indicates protected information, wherein the exposure element type indicates information that is protected when considered collectively with other information, and wherein the exposure unprotected type indicates unprotected information; and
            determining the PII exposure risk based on the exposure type; and
        selectively providing, based on the PII exposure risk, the query result data set to the user in response to the query, so as to refrain from providing the query result data set if the PII exposure risk is greater than a risk threshold.

2. The method of claim 1, wherein the determining the exposure type of the query result data set comprises determining a respective exposure type of a respective element of the query result data set.

3. The method of claim 1, wherein the determining the PII exposure risk based on the exposure type comprises:
    setting the PII exposure risk to a value based on an PII exposure risk of one or more elements of the query result data set.

4. The method of claim 3, further comprising:
    increasing the PII exposure risk in response to the respective exposure type being exposure complete; and/or
    decreasing or not changing the PII exposure risk in response to the respective exposure type being exposure unprotected.

5. The method of claim 1, wherein the determining the PII exposure risk based on the exposure type comprises:
    setting the PII exposure risk to a value based on an PII exposure risk of the query result data set;
    determining, in response to the exposure type of the query result data set being exposure element, one or more relationships with elements of the query result data sets in the exposure storage log;
    determining a composite PII exposure risk associated with the query result data set based on the one or more relationships with elements of the query result data sets in the exposure storage log; and
    modifying the PII exposure risk based on the composite PII exposure risk associated with the query result data set.

6. The method of claim 1, wherein the risk threshold is based on one or more elements of the query result data set.

7. The method of claim 1, wherein the risk threshold is based on a policy associated with the user.

8. The method of claim 1, wherein the risk threshold is based on a policy associated with one or more elements in the query result data set.

9. The method of claim 1,
    wherein the generating the query result data set comprises generating the query result data set without providing the query result data set to the user.

10. The method of claim 1, further comprising:
    determining a group PII exposure risk associated with the query result data set based on an evaluation of combining the query result data set with a group exposure storage log comprising query result data sets from past queries associated with a group of users including the user,
    wherein the selectively providing the query result data set to the user comprises selectively providing, based on the PII exposure risk and/or the group PII exposure risk, the query result data set, so as to refrain from providing the query result data set if the PII exposure risk is above a risk threshold and/or if the group PII exposure risk is above a group risk threshold.

11. The method of claim 1, further comprising:
adding the query result data set to the exposure storage log, in response to the PII exposure risk being less than or equal to the risk threshold.

12. The method of claim 11,
wherein the adding the query result data set to the exposure storage log comprises tagging elements of the query result data set in the database to indicate the user, a timestamp, and/or information associated with the query.

13. The method of claim 12, wherein the determining the PII exposure risk comprises:
identifying an element in the exposure storage log that corresponds to the query result data set;
determining an age of the element in the exposure storage log that corresponds to the query result data set based on a timestamp associated with the element in the exposure storage log that corresponds to the query result data set; and
decreasing the PII exposure risk in response to the age being greater than an age threshold.

14. The method of claim 11, further comprising:
setting an associated PII exposure risk associated with the query result data set in the exposure storage log.

15. The method of claim 1, wherein the query result data set is generated at a first time, and wherein the determining the PII exposure risk comprises:
generating, in response to the query, a past query result data set based on information in the database at a second time earlier than the first time; and
decreasing the PII exposure risk, in response to determining that the query result data set is different from the past query result data set.

16. The method of claim 1, wherein the database comprises an immutable database comprising data in the immutable database that is marked as deleted, wherein the selectively providing the query result data set to the user comprises:
determining that the query result data set includes at least one data element that is marked as deleted in the immutable database; and
selectively providing the query result data set to the user if the user is authorized to access the at least one data element that is marked as deleted in the immutable database and based on the PII exposure risk.

17. The method of claim 1, wherein selectively providing, based on the PII exposure risk, the query result data set to the user comprises providing a modified query result that has reduced accuracy to the user.

18. The method of claim 1, further comprising restricting providing future query result data sets to the user based on the PII exposure risk of the provided query result data set.

19. A network device comprising:
a network interface configured to communicate with a user query interface through a data network;
a security inference control processor; and
a memory coupled to the security inference control processor and storing computer readable program code that is executable by the security inference control processor to perform operations comprising:
receiving a query from a user device that is associated with a user through a network interface circuit;
generating, in response to the query, a query result data set based on information in a database stored in a memory comprising a non-volatile data storage device;
determining a Personally Identifiable Information (PII) exposure risk associated with the query result data by:
evaluating a combination of the query result data set with an exposure storage log comprising query result data sets from past queries associated with the use;
determining an exposure type of the query result data set, wherein the exposure type comprises one of exposure complete type, exposure element type, or exposure unprotected type, wherein the exposure complete type indicates protected information, wherein the exposure element type indicates information that is protected when considered collectively with other information, and wherein the exposure unprotected type indicates unprotected information; and
determining the PII exposure risk based on the exposure type; and
selectively providing, based on the PII exposure risk, the query result data set to the user in response to the query, so as to refrain from providing the query result data set if the PII exposure risk is greater than a risk threshold.

20. A computer program product, comprising:
a non-transitory computer readable storage medium comprising computer readable program code embodied in the medium that when executed by a security inference control processor of a first network device causes the processor to perform operations comprising:
receiving a query from a user device that is associated with a user through a network interface circuit;
generating, in response to the query, a query result data set based on information in a database stored in a memory comprising a non-volatile data storage device;
determining a Personally Identifiable Information (PII) exposure risk associated with the query result data by:
evaluating a combination of the query result data set with an exposure storage log comprising query result data sets from past queries associated with the use;
determining an exposure type of the query result data set, wherein the exposure type comprises one of exposure complete type, exposure element type, or exposure unprotected type, wherein the exposure complete type indicates protected information, wherein the exposure element type indicates information that is protected when considered collectively with other information, and wherein the exposure unprotected type indicates unprotected information; and
determining the PII exposure risk based on the exposure type; and
selectively providing, based on the PII exposure risk, the query result data set to the user in response to the query, so as to refrain from providing the query result data set if the PII exposure risk is greater than a risk threshold.

* * * * *